United States Patent
Oldemeier et al.

(10) Patent No.: US 9,440,483 B2
(45) Date of Patent: Sep. 13, 2016

(54) COMBINED PRESS LAMINATION AND MEMBRANE LAMINATION

(75) Inventors: Christof Oldemeier, Jockgrim (DE); Bertram Lohr, Alberswelier (DE); Jens Reinert, Neuburg (DE)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 184 days.

(21) Appl. No.: 14/118,260

(22) PCT Filed: May 2, 2012

(86) PCT No.: PCT/EP2012/057991
§ 371 (c)(1),
(2), (4) Date: Apr. 2, 2014

(87) PCT Pub. No.: WO2012/156200
PCT Pub. Date: Nov. 22, 2012

(65) Prior Publication Data
US 2014/0205812 A1    Jul. 24, 2014

(30) Foreign Application Priority Data
May 19, 2011    (DE) .................. 10 2011 076 120

(51) Int. Cl.
*B44C 1/10*    (2006.01)
*B29C 63/02*    (2006.01)
(Continued)

(52) U.S. Cl.
CPC ............... *B44C 1/10* (2013.01); *B29C 63/02* (2013.01); *B29C 63/16* (2013.01); *B27D 1/00* (2013.01);
(Continued)

(58) Field of Classification Search
CPC ....... B29C 63/02; B29C 63/16; B29C 39/00; B29L 2031/3014; B44C 1/10; Y10T 156/10; Y10T 156/1028; Y10T 156/1034; B27D 1/08; B27D 1/00; B27D 1/10
USPC .......................................... 156/245
See application file for complete search history.

(56) References Cited

U.S. PATENT DOCUMENTS

| 4,447,282 | A | * | 5/1984 | Valerio et al. ................ 156/285 |
| 2002/0018907 | A1 | * | 2/2002 | Zehner ...................... 428/537.1 |
| 2010/0288442 | A1 | | 11/2010 | Damm | |

FOREIGN PATENT DOCUMENTS

DE    10160173 A1    6/2003
DE    10305064 A1 *  8/2004
(Continued)

OTHER PUBLICATIONS

International Search Report for corresponding PCT Application No. PCT/EP2012/057991, dated Jul. 11, 2013.
(Continued)

*Primary Examiner* — Philip Tucker
*Assistant Examiner* — Vicki Wu
(74) *Attorney, Agent, or Firm* — Timothy X. Gibson, Esq.; Gibson & Dernier LLP

(57) ABSTRACT

The invention relates to a method for laminating a substrate with a decoration (104), wherein the substrate comprises a first portion (114) and a second portion (116), wherein the method simultaneously comprises membrane lamination and press lamination, wherein the press lamination is carried out in a first region (118) of the decoration (104), and the membrane lamination is carried out in a second region (122) of the decoration (104), wherein the first region (118) directly borders the second region (122), wherein the first region (118) comprises the first portion fully and the second portion partially, and wherein the second region comprises the part of the second portion that is not contained in the first region (118).

5 Claims, 2 Drawing Sheets

(51) Int. Cl.
   *B29C 63/16* (2006.01)
   *B27D 1/08* (2006.01)
   *B27D 1/00* (2006.01)
   *B27D 1/10* (2006.01)
   *B29C 39/00* (2006.01)
   *B29L 31/30* (2006.01)

(52) U.S. Cl.
   CPC . *B27D 1/08* (2013.01); *B27D 1/10* (2013.01); *B29C 39/00* (2013.01); *B29L 2031/3014* (2013.01); *Y10T 156/10* (2015.01); *Y10T 156/1028* (2015.01); *Y10T 156/1034* (2015.01); *Y10T 428/24612* (2015.01)

(56) References Cited

FOREIGN PATENT DOCUMENTS

| | | |
|---|---|---|
| DE | 102004010097 A | 9/2005 |
| DE | 102009020991 A1 | 11/2010 |
| WO | WO 9743098 A1 * | 11/1997 |

OTHER PUBLICATIONS

International Preliminary Report on Patentability and Written Opinion for corresponding PCT Application No. PCT/EP20121057991, dated Nov. 28, 2013.

Partial Translation of DE Office Action for corresponding DE Application No. 10 2011 076 120.9, dated Jan. 24, 2012.

* cited by examiner

COMBINED PRESS LAMINATION AND MEMBRANE LAMINATION

The invention relates to a method for laminating a substrate with a decoration by means of a combined press lamination and membrane lamination method, a device for laminating a substrate, and also a substrate.

SUMMARY OF THE INVENTION

Various lamination methods are known from the prior art. These each concern exclusively either a membrane lamination method or a press lamination method.

By contrast, the object of the invention is to provide an improved method for laminating a substrate with a decoration, an improved device for laminating a substrate, and an improved substrate.

A method for laminating a substrate with a decoration is created, wherein the substrate comprises a first and a second portion, wherein the method simultaneously comprises membrane lamination and press lamination, wherein the press lamination is carried out in one region of the decoration and the membrane lamination is carried out in a second region of the decoration, wherein the first region immediately borders the second region and the first region comprises the first portion fully and the second portion partially, and wherein the second region comprises the part of the second portion that is not contained in the first region.

In other words, a membrane and press lamination method is thus carried out simultaneously using a common tool, wherein the first region comprises the first portion and additionally partially overlaps the second portion.

Embodiments of the invention have the advantage that transitions between the first and second portion of the substrate can be laminated in an optimal manner. Instead of now thus using exclusively either a press lamination method or a membrane lamination method, it is proposed here to use a combination of these two lamination methods, wherein the method is preferably carried out simultaneously in the form of membrane lamination and press lamination with use of an individual laminating device.

Since an overlap region exists, in which the press lamination method is also carried out in the region of the second portion, impressions of the substrate located beneath the decoration in the transition region between the first and second portion can be avoided in an optimal manner. In addition, this makes it possible to compensate for dimensional tolerances of the substrate in a simple manner. Whereas the press lamination method specifically forces the decoration into a rigid predefined shape, the membrane lamination method enables flexible adaptation of the decoration to the shape and, in some circumstances, the size of the substrate, the size of the substrate being subject to tolerances.

In accordance with an embodiment of the invention, the material hardness of the first portion is lower than the material hardness of the second portion. For example, the first portion comprises a foamed material and the second portion comprises an unfoamed material. If the second portion for example comprises a material that, compared to the first portion, can only be compressed with difficulty or even cannot be compressed, such as a hard plastic or a wood fiber material, a method involving purely press lamination would thus achieve an optimal lamination result in the region of the first portion, since, due to the rigid upper die (punch) used with the press lamination method, a lamination process can take place that is controlled such that an undesirable compression of the material of the first portion is avoided. If, however, the second portion has manufacturing tolerances for example, these cannot be compensated for in a flexible manner due to the rigid upper die, and therefore the substrate beneath the decoration is marked on the whole in an undesirable manner.

If, by contrast, a membrane lamination method were used exclusively, the decoration in the region of the first portion would thus be pressed in an uncontrolled manner onto said first portion due to the process of pressing the membrane onto the decoration, whereby this would lead to an uncontrolled and also undesirable compression of the first portion. Tolerances in the region of the second portion could indeed thus be compensated for optimally, since the membrane lamination adapts the decoration in a flexible manner to the surface, which is subject to tolerances. However, in the transition region between the first and second portion, the underlying substrate is then also marked, since the first portion is compressed to a greater degree.

Due to the combination of a press and membrane lamination method and overlapping of the press lamination method for the transition region between the first and second portion, these problems are taken into account however and an optimal lamination result is produced with an individual continuous decoration, which covers the first and the second portion cohesively and integrally, without visibly marking the substrate beneath the decoration.

In accordance with a further embodiment of the invention, the press lamination is implemented by means of a punch, wherein the punch is pressed onto the first region of the decoration, and wherein a membrane used for the membrane lamination is arranged on the punch itself. For example, this membrane is fixed to the punch. This enables an approach that is mechanically simple on the whole for laminating a substrate with a decoration, since the lamination process can be performed in a single lamination step with use of an individual upper die, which comprises both the punch and the membrane.

In accordance with an embodiment of the invention, the punch has a contact area for the decoration, wherein the membrane is arranged on a side of the punch facing away from the contact area of the punch. For example the membrane extends over the rear face of the punch in a planar manner. This in particular has the advantage that the vacuum necessary for membrane lamination can be produced and maintained in a simple manner. Since the membrane specifically extends in a planar manner over the rear face of the punch, no significant problems with regard to tightness are produced, that is to say no air can appear undesirably between the punch and membrane at fixing points, extending over a large area, which fix the membrane to the punch. It is noted however that this does not rule out the provision of a mechanical guide for the upper die. For example, the upper die may be fastened to a mechanism via an appropriate strutting, wherein the membrane has recesses in the region of the strutting and is sealed exclusively in the region of the strutting with respect to an undesirable infiltration of air. In particular, a much smaller area is produced here however, via which air may potentially infiltrate between the membrane and punch, as would be the case if the punch were to comprise the membrane fastening merely in an edge region.

In accordance with a further embodiment of the invention, the method is carried out by means of a bottom die, which supports the substrate, wherein the bottom die comprises a first suction region in order to fix the substrate to the bottom die, wherein the bottom die has a second suction region, wherein the second suction region is different from the first suction region, that is to say the first and second suction region have separate suction circuits. A vacuum is therefore used to fix the substrate to the bottom die and also to apply the membrane to the decoration. For example, the pump circuits or suction circuits used here can be controlled separately, and therefore the sequence between suction of the substrate and membrane can be controlled over time in an optimal manner. On the whole, a lamination process that can be controlled in an optimal manner and therefore a laminated substrate appearing to be of high quality is thus produced.

In a further aspect, the invention relates to a device for laminating a substrate with a decoration by simultaneous membrane lamination and press lamination, wherein the substrate comprises a first and a second portion, wherein the device is designed to carry out the press lamination in a first region of the decoration and to carry out the membrane lamination in a second region of the decoration, wherein the first region directly borders the second region, wherein the first region comprises the first portion fully and the second portion partially, and wherein the second region comprises the part of the second portion that is not contained in the first region.

In a further aspect, the invention relates to a substrate, wherein the substrate comprises a decoration, wherein the substrate has been laminated with the decoration by means of the above-described method.

BRIEF DESCRIPTION OF THE DRAWINGS

Preferred embodiments of the invention will be explained in greater detail hereinafter with reference to the drawings, in which.

DETAILED DESCRIPTION OF THE INVENTION

Similar elements will be denoted hereinafter by like reference signs.

Figure 1:
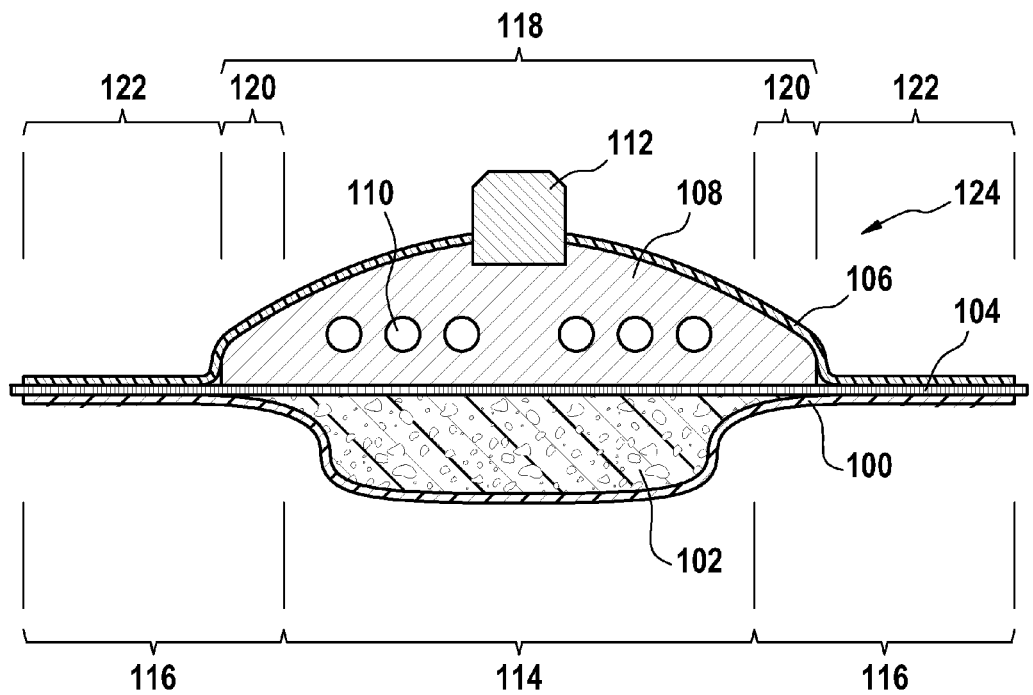
FIG. 1 shows a schematic cross-sectional view for a device for laminating a substrate with a decoration.

FIG. 1 shows a device 124 for laminating a substrate, which, in the embodiment shown in FIG. 1, comprises a wood fiber substrate 100 and a soft material 102, for example a foaming, to fill out this wood fiber substrate 100 in part. The foaming 102 can be compressed here much more easily than the wood fiber substrate 100 itself. With regard to this substrate however, a region 114, which comprises a soft material 102 on the side to be laminated, and also two regions 116 bordering the region 114 are thus produced, wherein the regions 116 comprise the wood fiber substrate 100 without soft material.

It should be noted however that, instead of soft material in the form of foamings and instead of wood fiber substrates, various other types of materials can also be used, such as plastics of different hardness.

The objective is then to laminate the substrate shown in FIG. 1, that is to say the surfaces of the regions 114 and 116, with a decoration 104 in a planar and integral manner. To this end, a combination of a press lamination and membrane lamination method is used. The used tool 124 to this end comprises an upper die 108 in the form of a punch, wherein the punch 108 can be applied to the decoration 104 by means of a strutting 112 by a mechanism (not shown in FIG. 1). The punch 108 is penetrated by heating channels 110, which make it possible to heat the punch to a suitable temperature.

In addition, the punch 108 comprises a membrane 106 on its upper side, that is to say the side facing away from the decoration 104, said membrane extending in a planar manner over the rear face of the punch.

The substrate therefore comprises a first portion 114 and a second portion 116, wherein the device 124 is able to carry out a press lamination method in a first region 118 and a membrane lamination method in bordering second regions 122. Here, the region 118 overlaps an edge region between the portions 114 and 116. This overlap region is denoted by reference sign 120.

If the membrane and press lamination methods are now carried out simultaneously, a controlled pressure is thus exerted onto the decoration 104 due to the rigid punch 108 in the region 118. Here, the contact pressure is selected such that an undesirable compression of the material in the portion 114 is avoided. Since a membrane lamination method is used in the regions 122 however, potential manufacturing tolerances of the substrate can be compensated for on the whole in the longitudinal direction in FIG. 1, since the membrane can adapt in a flexible manner to the wood fiber substrate, that is to say to the shape and length thereof, in the regions 122.

The overlap region 120 is selected here optimally, such that it is possible to ensure on the one hand that a lamination process can be fully controlled in respect of the material 102 in the portion 114, and on the other hand that corresponding markings of the substrate beneath the decoration are avoided in particular in the transition region between the portions 114 and 116.

Figure 2:
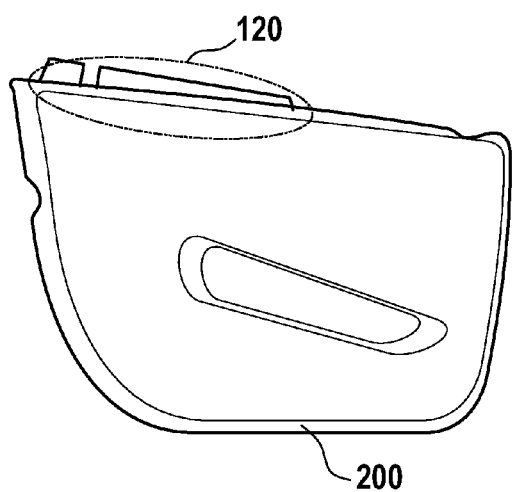
FIG. 2 shows a schematic view of a motor vehicle door.
Figure 3:
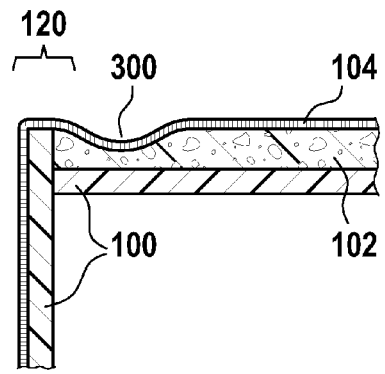
FIG. 3 shows a schematic cross-sectional view of a substrate with decoration.

FIG. 2 shows a motor vehicle door 200, which, in an overlap region 120, comprises a transition of substrate materials which have different material hardnesses. For example, the motor vehicle door may comprise a foaming over a large area, said foaming producing a pleasant feel in the vehicle interior when the vehicle door is touched, wherein the decoration merely in the edge regions is applied directly to the hard plastic shell of the motor vehicle door 200, that is to say for example the door module thereof. If it is then assumed that manufacturing tolerances occur on the whole during the production of this hard plastic shell, a method purely involving press lamination therefore would lead to a marking of the substrate on the decoration, since the substrate cannot be laminated in an exact manner with the decoration. If, however, a method exclusively involving membrane lamination is used, which can compensate for corresponding tolerances, the result shown in FIG. 3 may thus be produced:

FIG. 3 shows a cross-sectional view of a substrate which comprises a material having a high material hardness (material 100) and also a material 102 having a material hardness lower than that of the material 100. Due to the uncontrollable force which occurs during membrane lamination and which is exerted through the decoration 104 onto the material 102, there is now the risk that a deformation occurs, for example in the region denoted by reference sign 300, due to an exertion of pressure on the decoration 104. This deformation is the result of the force that is exerted from the membrane (not shown in FIG. 3) onto the decoration 104 during the lamination process.

If, instead, a method exclusively involving press lamination were used in respect of the material 102 and a membrane lamination method were used in the edge regions between the material 102 and the material 100, that is to say in FIG. 3 at the left outer edge of the overlap region 120, such a deformation can be avoided. In addition, it is possible to compensate for manufacturing tolerances in respect of the material 100.

Figure 4:
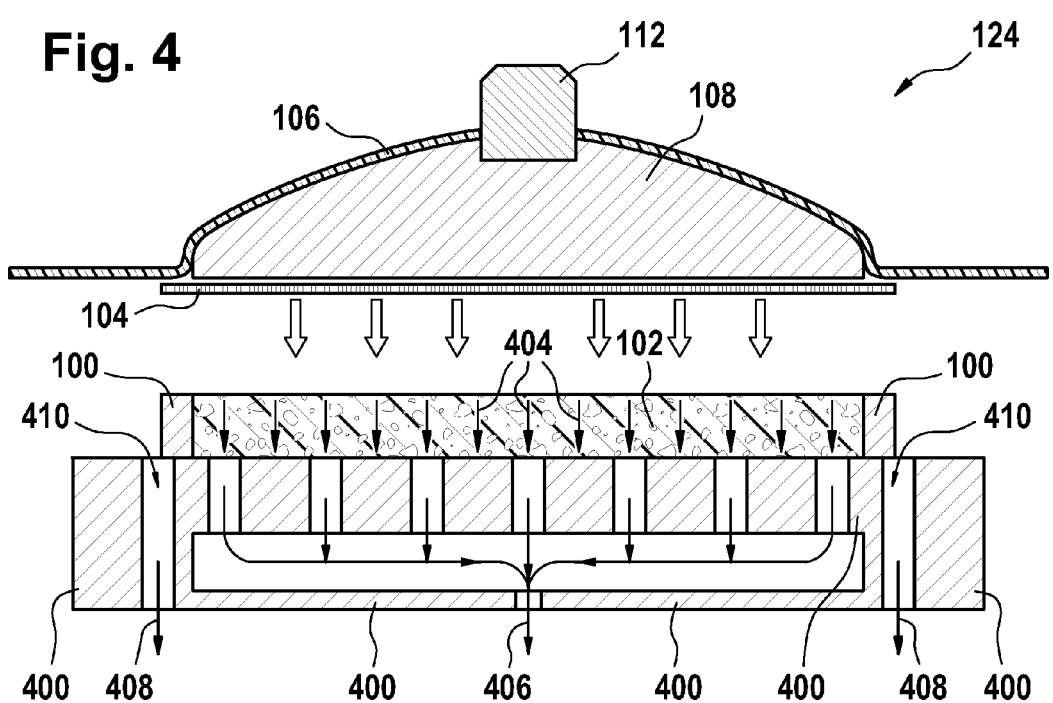
FIG. 4 shows a schematic view of a device for laminating a substrate.

FIG. 4 shows a further cross-sectional view of a lamination device 124, wherein this device is substantially identical to the device shown in FIG. 1.

In FIG. 4, the suction channels by means of which the substrate to be laminated is suctioned against the bottom die and preferably fixed are now clearly visible. For the sake of simplicity, merely part of the substrate has been illustrated in FIG. 4, specifically the part of the substrate with the material 102 (for example the soft material) and the part of the substrate with the hard material 100.

The bottom die, besides various suction channels 406 and 408, also comprises corresponding supporting contours 400, that is to say corresponding elevations and indentations, which are matched to the shape of the underside of the substrate to be laminated. In addition, the bottom die comprises corresponding channels, via which a suction process in which air is suctioned can be implemented.

If the substrate is thus now applied to the bottom die, a suction process is initiated due to a vacuum applied via the air-guiding system 406. On the one hand, this causes the substrate to be suctioned onto the bottom die 400. On the other hand, the substrate is at least partially air-permeable, and therefore an airflow from above through the substrate in the direction of the air-guiding system 406 is additionally produced in the direction 404.

If the decoration 104 is then applied to the substrate, the decoration is likewise suctioned onto the substrate due to the airflow in the direction 404 and is preferably at least partially fixed thereto.

During the actual lamination process, the punch 108 is then placed on the decoration material 104 and air is simultaneously aspirated via the air circuit 408. As a result, air can flow in the direction of the suction circuit 408 in the region 410, which comprises a gap between the outer edge region of the substrate part 100 and the bottom die 400. The membrane 106 is thus pressed onto the decoration 104, and the decoration 104 is thus pressed onto the substrate, whereby the substrate, in this case the part of the substrate with the material 100, is laminated by the decoration 104.

The membrane can be matched in a flexible manner to the contour of the material 100 and can therefore compensate for corresponding manufacturing tolerances of the substrate.

Based on FIG. 1, the bottom die 400 in the transition region between the overlap 120 and region 122 therefore comprises an air guide, which makes it possible, independently of further air-guiding devices in the region 118, to carry out a membrane lamination method as a result of the fact that the membrane 106 is suctioned onto the decoration 104. The bottom die thus comprises a first air guide in the region 118 and therefore in the portion 114, and comprises a second air guide in the region 122 and therefore in the portion 116, wherein the first air guide is used to fix the substrate and/or the decoration to the bottom die 400, and the second air guide is used to enable the execution of a membrane lamination method by suctioning of the membrane 106 onto the decoration 104. Here, the first air guide can be controlled independently of the second air guide. The air guides can be produced for example by corresponding air channels. It is likewise possible for the region 410 in FIG. 4 in particular to be produced by a groove in the bottom die, said groove running around the material 100.

A control unit (not illustrated in greater detail in FIG. 4) could, for example, ensure that a process in which the substrate is suctioned onto the bottom die is firstly introduced initially via the air-guiding system 406, as described above. At the start, the force with which the substrate is suctioned is preferably still quite low. This enables a potentially necessary displacement and arrangement of the substrate on the bottom die so as to thus produce an optimal relative positioning of the substrate and bottom die.

Since the substrate is at least partially air-permeable, the decoration 104, due to the subsequent application thereof to the substrate, is likewise suctioned onto the substrate due to the airflow in the direction 404. The low suction force, here too, enables simple positioning and, where applicable, correction of the relative position of the decoration 104 and substrate.

Only once the substrate and decoration are in the optimal position is the control unit informed of this, for example by a person operating the system. The control unit then increases the suction pressure via the air-guiding system 406. The decoration and substrate are therefore fixed securely to the bottom die and cannot slip when the punch 108 is placed on the decoration material 104.

During the actual lamination process, the air aspiration via the air circuit 408 is initiated by the control unit, and the punch 108 is placed on the decoration material 104.

LIST OF REFERENCE SIGNS 100 substrate with high material hardness
102 substrate with low material hardness
104 decoration
106 membrane
108 punch
110 heating channel
112 strut
114 first portion
116 second portion
118 first region
120 overlap region
122 second region
124 device
200 motor vehicle door
300 region
400 bottom die
404 airflow direction
406 air circuit
408 air circuit
410 recess

The invention claimed is:

1. A method for laminating a substrate with a decoration, wherein the substrate comprises a first portion and a second portion, wherein the method simultaneously comprises membrane lamination and press lamination, wherein the press lamination is carried out in a first region of the decoration, and the membrane lamination is carried out only in a second region of the decoration, wherein the first region directly borders the second region, wherein the first region comprises the first portion fully and the second portion partially, and wherein the second region comprises the part of the second portion that is not contained in the first region.

2. The method according to claim 1, wherein the material hardness of the first portion is lower than the material hardness of the second portion.

3. The method according to claim 1, wherein the first portion comprises a foamed material, and the second portion comprises an unfoamed material.

4. The method according to claim 1, wherein the press lamination is performed by means of a punch, wherein the punch is pressed onto the first region of the decoration, wherein a membrane used for the membrane lamination is arranged on a side of the punch opposite an interface between the punch and the first region of the decoration.

5. A method for laminating a substrate with a decoration, wherein the substrate comprises a first portion and a second portion, wherein the method simultaneously comprises membrane lamination and press lamination, wherein the press lamination is carried out in a first region of the decoration, and the membrane lamination is carried out in a second region of the decoration, wherein the first region directly borders the second region, wherein the first region comprises the first portion fully and the second portion partially, and wherein the second region comprises the part of the second portion that is not contained in the first region, wherein press lamination is conducted by pressing a punch onto the first region of the decoration, and wherein a membrane used for the membrane lamination is arranged on a side of the punch opposite an interface between the punch and the first region of the decoration.

\* \* \* \* \*